Figure 1:
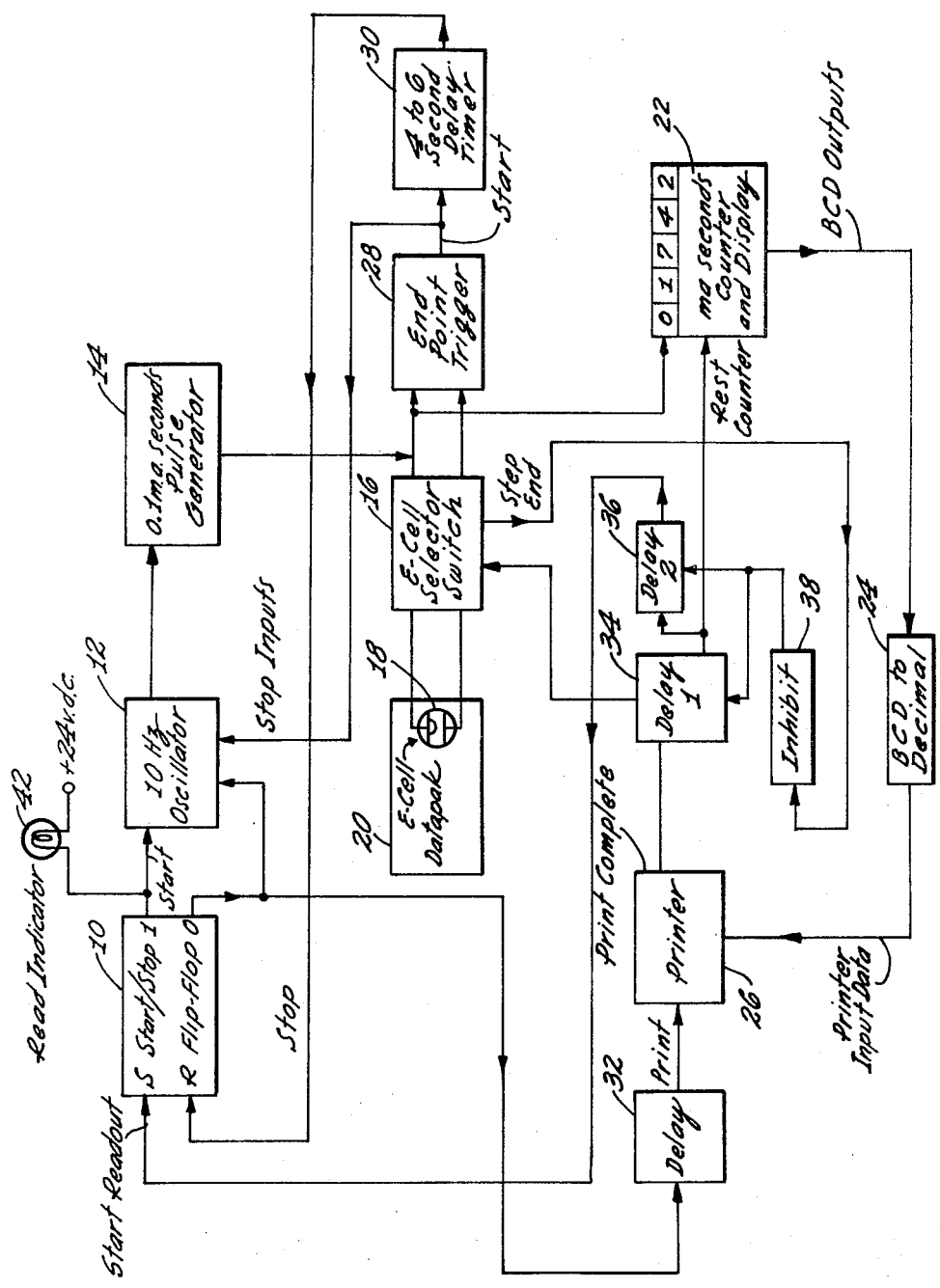

United States Patent
Pinto

[15] 3,680,063
[45] July 25, 1972

[54] AUTOMATIC DATA READOUT

[72] Inventor: James J. Pinto, San Diego, Calif.
[73] Assignee: The Bissett-Berman Corporation, Santa Monica, Calif.
[22] Filed: July 10, 1970
[21] Appl. No.: 53,749

[52] U.S. Cl. .................................. 340/173 CH, 340/173 R
[51] Int. Cl. ......................................................... G11c 13/02
[58] Field of Search ............................. 340/173 CH, 173 R

[56] References Cited

UNITED STATES PATENTS

| 3,172,083 | 3/1965 | Constantine | 340/173 |
| 3,387,288 | 6/1968 | Bissett | 340/173 |
| 3,432,814 | 3/1969 | Bissett | 340/173 |

Primary Examiner—Terrell W. Fears
Attorney—Smyth, Roston & Pavitt

[57] ABSTRACT

An automatic data readout is provided to extract data stored in a plurality of electrolytic cells, such as 20 cells, which cells form a data pack to store 20 channels of information. The automatic data readout reads out the 20 channels of information stored in the cells, either in a manual mode or automatically in sequence 1 through 20. A printer operates to record the data readout from a first one of the channels before passing on to read out a next channel of information. The readout is accomplished by deplating the electrolytic cells by passing a plurality of pulses each having a fixed charge value through the cell in a direction to deplate the electrolytic cell. When the voltage across the electrolytic cell rises above a particular value, the pulses are discontinued. However, if the voltage across the cell then drops below a particular value within a predetermined time, such as 4 to 6 seconds, then the readout pulses are continued. The number of pulses fed to the electrolytic cell represents the true digital count of the stored integral in the electrolytic cell.

26 Claims, 3 Drawing Figures

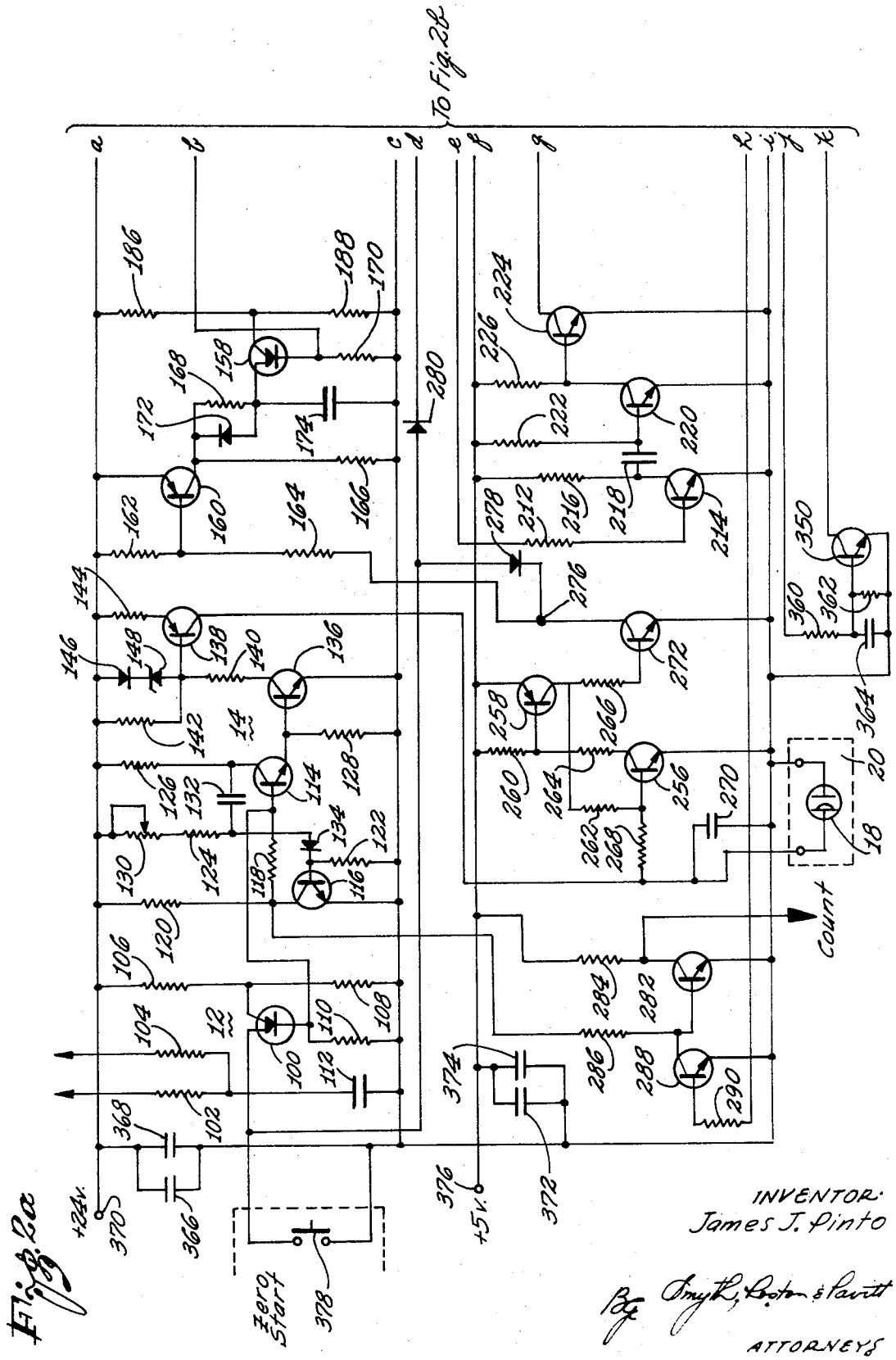

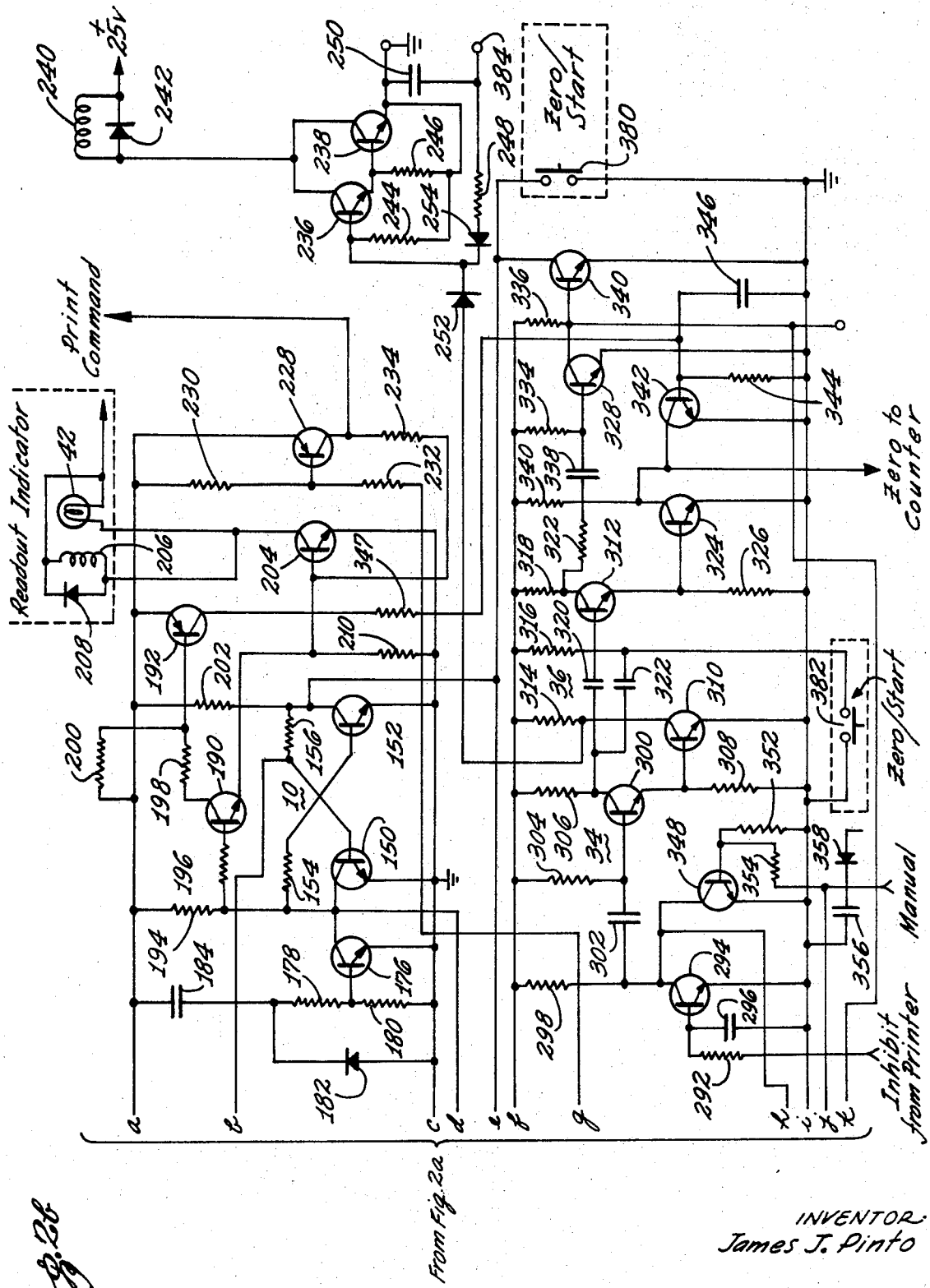

AUTOMATIC DATA READOUT

The present invention is directed to an automatic data readout system which is used to extract stored data from a plurality of electrolytic cells, which plurality of cells form a data pack. The electrolytic cells may be of the type shown in U.S. Pat. No. 3,423,648, listing Martin Mintz as the inventor, and may use an electrolyte of the type shown in U.S. Pat. No. 3,423,643, listing Edmund A. Miller as the inventor, both patents issuing on Jan. 21, 1969, and having the same assignee as the instant application.

The electrolytic cell referred to above operates by providing for the passage of silver ions through the electrolyte from a first electrode to a second electrode with the plating of the silver occurring upon the passage of current. The electrolytic cell, therefore, operates as an integrator to store information by plating silver in accordance with the quantity of the information. The stored information may be read out by passing current in the opposite direction to deplate the silver and with the total current time product representing the stored information.

One difficulty which has been experienced with the reading out of the information is that the stored information in the form of plated silver may be accumulated over a relatively long period of time, such as hours or even days. However, in order to read out this information, it is desirable to extract or deplate the silver as quickly as possible. If a constant current is used to deplate the silver, this may result in a false rise in voltage across the electrolytic cell which represents a false end point for the deplating process. It has been determined that in order to provide for a relatively fast readout of the electrolytic cell with good accuracy, it is necessary that the current initially have a relatively highvalue, and as the end point is being reached, the value of the current is decreased.

A method of providing such a rapid readout is disclosed in U.S. Pat. No. 3,387,288, filed in the name of Thomas B. Bissett and Martin S. Tatch, issued June 4, 1968, and assigned to the same assignee as the instant case. Since it is difficult to provide for a measurement of the average current if the current is decreasing, a further improvement on U.S. Pat. No. 3,387,288 is shown in U.S. Pat. No. 3,518,501, listing Thomas B. Bissett and John B. Murphy as inventors, issued June 30, 1970, and assigned to the same assignee as the instant application, wherein a series of pulses formed by charging or discharging a capacitor is used to provide for the readout wherein the rate of the pulses decreases as the deplating of the silver nears the end point. The average DC value of the pulses therefore initially has a high value, which value decreases as the end point is approached to thereby provide for the general readout method shown in U.S. Pat. No. 3,387,288. It is then a simple matter to count the pulses and since each pulse has substantially a fixed charge vale, the total current time product representing the stored information may be easily determined.

The present invention includes several improvements over the system shown in U.S. Pat. No. 3,518,501 and, in addition, provides for the automatic readout of a plurality of electrolytic cells. Specifically, the present invention may be used to read out up to twenty channels or more of information, which information is stored in a plurality of electrolytic cells forming a data pack. As the data stored in each cell is read out, a printer operates to record the data just read out, and also at the same time the readout information is displayed. The display may be in motion as the data is being read out and the display holds the final value while the printer is operated. In the automatic mode the display is then zeroed in preparation for the next readout.

In order that all of the data is extracted from each electrolytic cell representing a channel of information, the readout waits for a predetermined period, such as 4 to 6 seconds, after the voltage across the electrolytic cell has risen above a predetermined value, such as 0.5 volt. If the voltage across the electrolytic cell then drops below a predetermined value, such as 0.4 volt within the period of 4 to 6 seconds, the readout is reactivated and additional pulses are introduced to the electrolytic cell. Only until the voltage across the electrolytic cell rises and then stays above the predetermined value for a period longer than 4 to 6 seconds is the readout completely inhibited and at that time the information is considered to be fully extracted.

As indicated above, when an integral representing information has been accumulated in an electrolytic cell, the simplest method for reading out the information is to pass a constant current through the electrolytic cell and measure the time interval until the voltage across the electrolytic cell rises. This method provides limited utility due to interstitial silver. If a relatively high current, such as 1 milliamp, is used for readout, the voltage rise across the electrolytic cell may occur when there is still silver left in the interstitial spaces of the anode, and the remaining silver may be as much as 10 to 20 percent of the original charge. If, on the other hand, readout is attempted with a sufficiently low current, such as 10 microamps, so as to allow extraction of the interstitial silver, the total time required to perform the readout becomes inordinately long. Therefore, the methods shown in U.S. Pat. Nos. 3,387,288 and 3,518,501 were developed.

In the present invention, a digitized variable rate method is used as part of the integration measuring instrument. The signals used to read out the electrolytic cells are digitized in terms of very accurate pulses, such as 0.1 milliampere second pulses which may be derived from an oscillator. An end point trigger circuit senses when the voltage across the electrolytic cell rises and provides a logic output to stop the pulse input to the electrolytic cell whenever the voltage across the electrolytic cell rises to a value such as 0.5 volt.

If the voltage across the electrolytic cell drops below a value such as 0.4 volt within a predetermined time such as 4 to 6 seconds, then the pulse input is reinitiated. The dropping of the voltage within the 4 to 6-second period of time indicates that all of the interstitial silver has not been extracted. If, however, the voltage remains above the value such as 0.4 volt for a period longer than 4 to 6 seconds, this indicates that a true end point has been achieved and the readout cycle is determined. The number of pulses fed to the electrolytic cell during the entire readout cycle represents the true digital count of the stored information.

The above described readout technique defines the end point as the retention of the stop voltage at a nominal value for a nominal time. The cut-off time delay may therefore be reduced to allow for lesser extraction of the interstitial silver with a resultant degrading of accuracy of the readout but with a faster readout. Also, the cut-off time delay may be increased so as to allow for the maximum extraction of interstitial silver with a resultant increase in the accuracy. However, the values referred to above provide for relatively high accuracy without increasing the time readout to an unreasonable value.

The variable rate digital readout method of the present invention enables electrolytic cells having varying amounts of interstitial charge and varying amounts of stored information to be read out with substantially equal accuracy. The electrolytic cells are therefore read out initially at a base rate and this rate then slows down to provide for the interstitial charge extraction. The readout rate therefore matches the extraction rate necessary to remove most of the silver and thereby to provide for excellent accuracy for all types of electrolytic cells.

In the operation of the automatic data readout system of the present invention, the operation in the automatic mode is essentially as follows: A start switch is initiated which sets a start-stop flip-flop to control an oscillator such as a 10 Hertz oscillator to produce pulses which in turn drive a pulse generator which produces output pulses having a value such as 0.1 milliamp. These 0.1 milliamp pulses are supplied to the electrolytic cell being read out and also to the counter and display unit.

When an end point is detected by the rising of the voltage across the electrolytic cell, the 10 Hertz oscillator is inhibited and a 4 to 6-second delay starts. If the voltage across the electrolytic cell does not recover during this 4- to 6-second period, the delay is not reset and an output from the delay is used to reset the start-stop flip-flop. In this reset mode, the readout is held and the printer is commanded to print the data that is held at the readout output lines. After the printout is complete, the selector switch is commanded to switch to a new electrolytic cell and after a delay the start-stop flip-flop is again set to begin the readout cycle.

If the voltage across the electrolytic cell recovers during the 4- to 6-second period, the trigger again starts the 10 Hertz oscillator and resets the 4- to 6-second time delay. Pulses continue until the voltage again rises across the electrolytic cell and the rise is again tested by the 4- to 6-second delay. The above operations continue until all of the electrolytic cells have been read out. During manual operation, the selector switch is inhibited and the counter and display hold the information.

A clearer understanding of the invention will be had with reference to the following description and drawings wherein:

FIG. 1 illustrates an automatic data readout system of the present invention in block diagram form; and FIGS. 2a and 2b illustrate an automatic data readout system of the present invention in schematic form.

In FIG. 1 the automatic data readout system of the present invention includes a start-stop relay 10 which provides an output signal to control a 10 Hertz oscillator 12. The output from the 10 Hertz oscillator in turn controls a 0.1 milliamp second pulse generator 14. The output from the pulse generator 14 is coupled through electrolytic cell selector switch 16 to an individual electrolytic cell 18 in a data pack 20.

The output from the pulse generator 14 is also coupled to a counter and display 22. The outputs from the counter and display 22 form a binary coded decimal signal. The binary coded decimal signal is passed to a binary coded decimal converter 24, which produces a decimal signal for coupling to a printer 26. The voltage across the electrolytic cell 18 is monitored by an end point trigger 28. The output from the end point trigger 28 controls a 4- to 6-second delay timer 30. The output from the delay timer 30 is used to provide a reset signal to the flip-flop 10. When a reset of the flip-flop 10 is provided, the reset signal is coupled to the oscillator 12 and, in addition, to a delay 32. The output from the delay 32 provides for a print command signal to the printer 26.

When the print is complete in the printer 26, a print complete signal from the printer 26 is applied to a first delay 34. The output from the first delay 34 controls the electrolytic selector switch 16 to select a new electrolytic cell for readout. The output from the first delay 34 is also coupled to the counter and display 22 to reset the counter and display. The output from the first delay 34 is also coupled to a second delay 36 and the output from the second delay 36 is used to set the start-stop flip-flop 10 so that a readout is provided for the new electrolytic cell chosen by the selector switch 16.

The electrolytic cell selector switch 16 provides a step end signal after all of the electrolytic cells have been read out. This end signal is coupled to an inhibit circuit 38 which inhibit circuit inhibits the first delay 34 and the second delay 36.

In the operation of the system of FIG. 1, assuming that a start readout signal is applied to the stop-start flip-flop 10 to set the flip-flop 10, the flip-flop 10 then produces a start signal to control the 10 Hertz oscillator 12. In addition, the read indicator 42 is actuated to provide for a visual indication to the operator that the readout system is providing for a readout of a particular electrolytic cell. The oscillator 12 controls the pulse generator 14 to provide for 0.1 milliamp second pulses which are fed through the electrolytic cell selector switch 16 to selectively deplate an electrolytic cell 18.

The pulses from the pulse generator 14 provide for the deplating of the electrolytic cell and the number of pulses are counted by the counter and display 22. The binary coded decimal signal outputs from the counter and display 22 are fed through a converter 24 to the printer 26. Near the end of the readout of the electrolytic cell 18, the voltage across the electrolytic cell starts to rise. When the voltage reaches a predetermined level such as 0.5 volts, the end point trigger 28 provides for a start signal which is applied to the 4- to 6-second delay timer 30. If the voltage across the electrolytic cell 18 drops below a predetermined level such as 0.4 volt within the 4- to 6-second time period, then the end point trigger 28 discontinues the production of the start signal.

During the period of time that the 4- to 6-second delay timer 30 is actuated, the start signal from the input trigger 28 also inhibits the 10 Hertz oscillator and accordingly the electrolytic cell is not receiving any pulses from the pulse generator 14. If the voltage drops below 0.4 volt within the 4- to 6-second period, then the 10 Hertz oscillator 12 again provides the signal to control the pulse generator 14 to produce pulses which are applied to the electrolytic cell 18. If, however, the voltage across the electrolytic cell 18 stays above the level of 0.4 volt for a period greater than 4- to 6-seconds, then the delay timer 30 produces a stop signal which is coupled to the flip-flop 10 to reset the flip-flop. The resetting of the flip-flop controls the oscillator 12 to be shut off. In addition, the resetting of the flip-flop 10 is coupled through a delay 32 to control the printer 26 to print whatever data is stored in the printer. Delay 32 insures that the printer has fully received all of the information from the counter and display 22 and such information has been converted by the converter 24.

When the printing is complete, the printer 26 provides a print-complete signal which is coupled to a first delay 34. After the first delay has occurred, the cell selector switch 16 is controlled to cycle to the next electrolytic cell within the data pack 20. The first delay insures that the printer 26 has completed its operations before the selector switch 16 is activated. The output from the first delay 34 also controls the counter and display 22 to be reset. In addition, the output from the first delay is coupled through a second delay 36 to again set the flip-flop 10 to initiate the cycle to read out the new electrolytic cell which has been selected. The second delay 36 insures that the counter and display has been reset before the flip-flop 10 is set.

When all of the electrolytic cells have been read out, the electrolytic cell selector switch 16 provides for a step end signal which is used to control the inhibit circuit 38. The inhibit circuit 38 in turn inhibits the first and second delays 34 and 36. In addition, in the manual mode, the inhibit circuit 38 receives a signal from the selector switch 16 after the readout of the particular electrolytic cell to again inhibit the circuits mentioned above.

FIGS. 2a and 2b illustrate in schematic form the automatic data readout of the present invention. The system of FIGS. 2a and 2b includes a free-running oscillator which is formed by a unijunction 100 and associated circuitry including resistors 102, 104, 106, 108, 110 and capacitor 112. The output from the free-running oscillator is a sawtooth wave and the timing for the sawtooth is set by the value of capacitor 112 in association with either one of the resistors 102 or 104. For example, the resistor 102 may have a value one-tenth of the resistor 104 so that the frequency of the output signal from the oscillator may either have a first particular value or ten times that particular value. The unijunction 100 in combination with the associated circuitry forms essentially the oscillator 12 shown in FIG. 1.

The output from the oscillator 12 is coupled to a monostable multivibrator including transistors 114 and 116. The monostable multivibrator also includes resistors 118 through 130, capacitor 132 and diode 134.

The outputs from the Monostable multivibrator are pulses of a desired constant width. These pulses are fed to a constant current source including transistors 136 and 138 and resistors 140, 142 and 144. In addition, diode 146 and Zener diode 148 form part of the constant current source. The output of the constant current source are pulses each having a desired constant width in accordance with the output produced by the monostable multivibrator and a desired constant amplitude in accordance with the constant current source. The combination of the monostable multivibrator and the constant current source form the pulse generator 14 shown in FIG. 1.

This start-stop flip-flop of FIG. 1 is formed by a circuit including the transistors 150 and 152 and resistors 154 and 156. The start-stop flip-flop 10 is triggered to the stop condition by the output from unijunction 158 which in turn is controlled by the output of the transistor 160. Associated with the transistor 160 are resistors 162, 164 and 166, and associated with the unijunction 158 are resistors 168 and 170, diode 172 and capacitor 174. The transistor 160 and the unijunction 158 form the 4- to 6-second delay timer 30 shown in FIG. 1. The transistor 160 is controlled to supply voltage to unijunction 158 when the voltage across the electrolytic cell being monitored rises to a particular level. The RC circuit including resistor 168 and capacitor 174 control the time such as 4 to 6 seconds before the voltage applied to the unijunction 158 is sufficient to trigger the unijunction and thereby provide a stop signal to the start-stop flip-flop 10. Resistors 186 and 188 act as a voltage divider to provide the proper voltage to the unijunction 158.

Transistor 176 in combination with resistors 178 and 180, diode 182 and capacitor 184 provide for an initial control of the start-stop flip-flop 10 so that the flip-flop is in the reset condition when power is first applied to the instrument.

Transistors 190 and 192 are in the off condition when the start-stop flip-flop 10 is in the stop condition. Associated with transistors 190 and 192 are resistors 194 to 202. The output of the transistor 190 is applied to transistor 204 which in turn controls readout indicator 42. In addition, relay 206 is on only when the readout indicator 42 is on. A diode 208 is in parallel with the relay 206. Relay 206 operates as an interlock relay so as to prevent loss of the electrolytic cell data if the operator physically switches from the automatic position during the reading of the electrolytic cell data. Resistor 210 is associated with a transistor 204.

When the flip-flop 10 is in the stop condition, the transistor 152 is off and this provides an output control signal which is fed through resistor 212 to transistor 214. Associated with transistor 214 is resistor 216 and capacitor 218. The output from transistor 214 is coupled to transistor 220 which has resistor 222 associated therewith. The output from transistor 220 is in turn coupled to transistor 224 and resistor 226 is in circuit with transistors 220 and 224. The transistor 152 goes off when the start-stop relay 10 is in the stop mode, which turns transistor 214 on. This turns transistor 220 off, which turns transistor 224 on. When transistor 224 goes on, this produces a signal to control transistor 228. Associated with transistor 228 are resistors 230, 232 and 234. The output of transistor 228 is used as a print command to the printer to print the number of counts that are held. After a period of time, such as 250 milliseconds, as determined by capacitor 218 and resistor 222, transistor 220 goes on, turning off transistor 224. This removes the signal from the base of transistor 228 thereby completing the print command.

Transistors 236 and 238 form driver coils for the electrolytic cell selector switch. This driver coil is designated 240 and a diode 242 is in parallel across the coil 240. Associated with the transistors 236 and 238 are resistors 244 and 246. In addition, resistor 248 and capacitor 250 are used with the driver circuit to provide a homing signal for the coil 240 so as to home the coil to its zero position. Diodes 252 and 254 are used to prevent the application of unwanted signals to the driver circuit.

The electrolytic cell 18 represents one of a number of cells in a data pack 20 and individual ones of the number of cells in the data pack are selectively coupled into the circuit in accordance with the activation of the coil 240. The constant current pulses of the fixed width from the transistor 138 are applied through the electrolytic cell 18 to deplate the cell.

Transistors 256 and 258 in association with resistors 260 through 268 and capacitor 270 form the end point detector to determine when the voltage across the electrolytic cell is above a predetermined value such as 0.5 volt. When the voltage rises, the transistors 256 and 258 become conductive, which in turn controls the transistor 272 to be on. Resistor 274 is associated with transistor 272.

When transistor 272 becomes conductive, it pulls terminal point 276 down through diode 278 to stop the oscillator 12 from running. The oscillator is prevented from operating since the capacitor 112 cannot charge. The oscillator 12 may also be prevented from operating when the flip-flop 10 is in the stop position. This occurs through diode 280 which also operates to prevent capacitor 112 from being charged.

The collector of transistor 116 provides the drive for transistor 282, which transistor in association with resistors 284 and 286 form the counter driver to supply pulses to the counter and display 22 shown in FIG. 1. Transistor 288 and associated resistor 290 are used to clamp transistor 282 during printout so as to insure that the data in the readout remains unchanged.

The inhibit signal from the printer is passed through resistor 292 to transistor 294. Capacitor 296 is also associated with transistor 294. The signal is from the printer to trigger transistor 294 on when the printer is printing the count. Also, the output from the transistor 294 is fed back to transistor 288 to prevent the counter from operating. The output from the transistor 294 is taken across resistor 298 and applied to a transistor 300 through capacitor 302 and across resistor 304. Resistors 306 and 308 are associated with the transistor 300. Capacitor 302 and resistor 304 form an RC circuit so that the transistor 300 is initially turned off when transistor 294 comes on, but after a period of time, such as approximately 50 milliseconds, when the capacitor 302 is charged sufficiently, the transistor again turns on. The capacitor 302 and resistor 304 form the first delay 34 shown in FIG. 1.

The turning on and off of the transistor 300 controls transistors 310 and 312. Associated with transistors 310 and 312 are resistors 314, 316, 318 and capacitors 320 and 322. When transistor 300 initially goes off, this turns off transistor 310 which turns on transistor 236 and 238 to energize the coil 240 to provide for the electrolytic cell selector switch 16 of FIG. 1 to switch to a new electrolytic cell. When the transistor 300 again turns on after the expiration of time, such as 50 milliseconds, as determined by the capacitor 302 and the resistor 304, this turns transistor 310 on to clamp off the transistors 236 and 238.

Transistor 312 is on when transistor 300 is off. When transistor 300 then goes on, transistor 312 goes off and when transistor 312 goes off, this controls a transistor 324 to go off. When transistor 324 goes off, this produces a zero signal to the counter to reset the counter to zero. Resistors 326 and 340 are associated with the transistor 324. After the expiration of a time delay which is determined by capacitors 320 and 322 and resistor 316, transistor 312 again turns on. This time delay may be for a short period of time such as 5 milliseconds and represents the second delay 36 shown in FIG. 1. At the end of this short period of delay, the transistor 312 again turns on, which then controls a transistor 328 to be off, which in turn controls a transistor 330 to be on.

The output of the transistor 328 is used to set the start-stop flip-flop 10 to the start mode, which then starts a new readout cycle on the electrolytic cell which has been switched into the readout circuit. Resistors 332, 334 and 336 and capacitor 338 are associated with transistors 328 and 330. The capacitor 338 and resistor 334 form a time delay so that after a predetermined period of time, such as 5 milliseconds, transistor 328 is again turned on, which turns off transistor 330. The flip-flop 10 has, of course, been put into the start mode but by turning off transistor 330, the flip-flop is then ready to receive a reset signal at the appropriate time.

A transistor 342 in combination with resistor 344 and capacitor 346 is used to control the output from the transistor 324. The transistor 342 receives a signal from transistor 192 through resistor 347. Specifically, the transistor 324 can only produce a signal which zeroes the counter if the transistor 342 is off. If the transistor 342 is on, then the transistor 324 cannot produce the high voltage signal which zeroes the counter.

Transistors 348 and 350 serve as inhibit clamps. Transistor 348 has resistors 352 and 354 associated with it and capacitor 356 and diode 358 are included in the input circuit to the transistor 346. Transistor 350 has resistors 360 and 362 associated with it in addition to a capacitor 364.

The circuit of FIG. 2 also includes capacitors 366, 368, which serve as filter capacitors for a source of positive voltage such as 24 volts which is applied at terminal 370. In addition, capacitors 372 and 374 serve as filter capacitors for a source of positive voltage, such as 5 volts, applied to terminal 376.

The circuit of FIGS. 2a and 2b also includes a plurality of switches 378, 380 and 382 which are used to start the operation of the system. The switches 378, 380 and 382 are interconnected and operate simultaneously. The circuit of FIGS. 2a and 2b also includes numerous output and input signals. There is a print command signal from the collector of transistor 228 which provides for a printing of the readout information. Also, a pair of signals are applied to the selector switch 16 shown in FIG. 1. First, there is a zero selector switch signal which is provided at terminal 384 and second there is an output signal from the collectors of transistors 236 and 238 which drives the coil 240 to provide for a switching to a new electrolytic cell by the selector switch 16.

Another output signal is taken from the collector of transistor 324 and this is a signal to zero the counter 22 shown in FIG. 1. A count signal is taken from the collector of transistor 282 which count signal is used by the counter 22 shown in FIG. 1 to provide for a count and display of the information being read out of the electrolytic cell.

Input signals which are applied to the circuit of FIG. 2, in addition to the signals provided by the start switches 378, 380 and 382 are as follows: The voltage across the electrolytic cell 18 being tested is applied as an input signal to the base of transistor 256 and the transistor 256 is part of the end point detector. In addition, an inhibit signal from the printer is applied to the base of transistor 294 and a manual signal is applied to the base of transistors 348 and 350 so as to inhibit the circuits in the system of FIGS. 2a and 2b when the system is in the manual mode.

When power is first applied to the automatic data readout of the present invention, capacitor 184 charges to turn on transistor 176 which grounds transistor 150, which keeps the start-stop flip-flop 10, which is formed by the transistors 150 and 152, in the reset condition until the other circuits stabilize. When the zero start button is depressed, this closes all of the switches 378, 380 and 382. Specifically, the transistor 152 becomes conductive to set the flip-flop 10 and to place the circuit of FIGS. 2a and 2b in the start mode.

In the start mode the oscillator, including the unijunction 12, runs free unless clamped by signals through diodes 278 and 280. The monostable multivibrator, including the transistors 116 and 114 shape the output of the oscillator into pulses having a substantially constant width, such as 1 millisecond and occurring in a period such as 100 milliseconds. The output from the monostable multivibrator is applied to the transistor 136 which serves as a driver for a constant current source including the transistor 138. The constant current source produces constant current pulses of a fixed width which are applied to the electrolytic cell for readout. The collector of the transistor 116 provides the base drives for the transistor 282 which transistor serves as the counter driver to provide for the count signal from the collector of the transistor 282. The transistor 288 clamps the transistor 282 during the printout of the information, insuring that the data in the readout remains unchanged.

Transistors 256 and 258 serve as the end point detector for the electrolytic cell under test. WHen the electrolytic cell reaches an end point which is indicated by the voltage across the electrolytic cell rising to a value such as 0.5 volts, transistor 272 is turned on which starts a delay such as 4 to 6 second delay. When the collector of the transistor 272 is at a positive potential such as 24 volts, this indicates that the electrolytic cell is still transferring material.

Transistor 160 serves as a voltage clamp to supply the 24 volts to the unijunction 158 which starts the 4- to 6-second delay period. The delay is actually determined by the value of the resistor 168 and the capacitor 174, which determines the time necessary before capacitor 174 is sufficiently charged to trigger unijunction 158.

As the system of FIGS. 2a and 2b is operating to provide for a readout, the transistors 190 and 192 provide for the proper logic levels to relay driver, including transistor 204 which, during the start mode, energizes the relay 206 and the indicator light 42. The relay 206 is used during the automatic relay to prevent loss of cell data if the operator inadvertenantly moves the selector switch from automatic to manual.

Transistors 348 and 350 are used as inhibit clamps. These transistors prevent the propagation of signals through transistors 294, 176, 150, 152, 300, 310, 312, 204, 324, 228 and 328. The inputs to transistors 348 and 350 are from the front panel selector switch when in the manual mode, and also when the electrolytic cell selector switch 16 is being homed to a zero position.

Propagation of signals from the base of transistor 214 through the collector of transistor 340 is as follows: When the flip-flop 10 is in the stop condition and transistor 152 turns off, then transistor 214 goes on and transistor 220 goes off, which turns on transistor 224. Transistor 224 supplies the base drive for transistor 228 which produces the print command from the collector of transistor 228. When a time delay, such as 250 milliseconds, determined by the value of capacitor 218 and resistor 22 expires, transistor 220 then turns on to turn off transistor 224. When transistor 224 is turned off this removes the signal from the base of transistor 228 but the printing of the information has already occurred.

The input to the base of transistor 294 is through the resistor 292 and this input is the inhibit signal from the printer. This inhibit signal is normally positive. During printing, the signal goes to ground, turning transistor 294 off. When transistor 294 is off, voltage rises at the collector and turns transistor 288 on to clamp transistor 282 and prevent the counter from receiving additional signals.

When the print cycle is complete, the voltage at the base of transistor 294 returns to a positive value to turn transistor 294 on, which then turns transistor 300 off. When transistor 300 is off, this turns off transistor 310 which directly controls transistors 236 and 238 to energize the coil 240 to provide for the electrolytic cell selector switch 16 shown in FIG. 1 to select a new electrolytic cell. After the expiration of a predetermined period of time, such as approximately 50 milliseconds determined by the value of capacitor 302 and resistor 304, transistor 300 again turns on. When transistor 300 turns on, this turns on transistor 310 which in turn clamps off transistors 236 and 238.

After the 50 millisecond period of time when the transistor 300 again turns on, this turns off transistor 312. The emitter coupled signal from transistor 312 turns off transistor 324 which produce the signal to reset the counter shown in FIG. 1. After the expiration of a time delay determined by the value of capacitors 320 and 322 and resistor 316 which may have a value such as 5 milliseconds, the transistor 312 again turns on which produces a signal to shut off transistor 328 which then turns on transistor 330. The collector of the transistor 330 clamps the start-stop flip-flop 10 to the start mode, starting a new sequence of counting out the information stored on the newly selected electrolytic cell. After the expiration of a period of time determined by capacitor 338 and resistor 334, which may be for a period such as 5 milliseconds, transistor 328 is then turned on, which turns off transistor 330. In this way, the start-stop flip-flop 10 may again be put in the stop mode when a true end point is detected which represents that all of the information on the electrolytic cell is deplated.

Generally then, the operation of the automatic readout device is that when the start-stop flip-flop is in the start mode, an oscillator such as a 10 Hertz oscillator produces pulses to drive a pulse generator, such as a 0.1 milliamp second pulse generator. These pulses are supplied to the electrolytic cell and also to the counter and display. When an end point is detected, the 10 Hertz oscillator is inhibited and a 4- to 6-second delay period starts. If the electrolytic cell does not recover during this 4- to 6-second delay period, the delay is not reset and the start-stop flip-flop is put into the stop mode. If, however, the electrolytic cell recovers during this 4- to 6-second delay period, the end point trigger again starts the 10 Hertz oscillator an resets the 4- to 6-second time delay. The pulses are continued to be applied through the cell until the true end point is reached.

In the reset mode for the start-stop flip-flop, the readout is held and the printer is commanded to print the data that is held at the readout output lines. The inhibit signal from the printer starts the delay which steps the selector switch to a new cell. At the end of the delay, the counter is reset and a second delay starts. At the expiration of the second delay, the start-stop flip-flop is set in the start mode and the sequence starts again. After the last electrolytic cell is read out, contacts on the selector switch produce a signal to inhibit the operation. A manual operation may be accomplished in this same manner except that the inhibit circuits are active at all times so that after a print is completed, there is no stepping to a new electrolytic cell.

Generally, the readout technique to the present invention defines the end point when all of the information is considered to be read out of each cell as the retention of the stop voltage at a nominal value for a nominal time. This produces a variable rate pulse signal being applied through the electrolytic cell to read out the information. Where the information is initially read out at a base rate and then slows down to equal the rate necessary to remove the silver which has been diffused in the interstitial spaces of the anode. The present invention therefore provides for excellent accuracy for all types of electrolytic cells no matter in which manner these cells have their information recorded. The patent only is to be limited by the appended claims.

I claim:
1. A digital readout for an electrolytic cell of the type including an active material which is plated on an electrode in response to information, including
   first means for producing fixed charge pulses of constant amplitude and fixed pulse width for application to the electrolytic cell to deplate the electrode,
   second means for monitoring the electrolytic cell for detecting when substantially all of the active material has been deplated from the electrode,
   third means for inhibiting the application of pulses to the electrolytic cell when the second means detects that substantially all of the active material has been deplated from the electrode, and
   fourth means for providing an output indication of the information in accordance with the number of pulses applied to the electrolytic cell before the third means inhibits the application of such pulses.

2. The digital readout of claim 1 wherein the fourth means includes a digital counter for providing a digital output indication in accordance with the number of pulses applied to the electrolytic cell.

3. The digital readout of claim 1 additionally including fifth means responsive to the inhibiting of the first means by the third means for printing the information contained in the fourth means.

4. The digital readout of claim 1 wherein a plurality of electrolytic cells may be read out in succession and additionally include selector means for successively switching to individual ones of the plurality of electrolytic cells and with each individual one of the plurality of electrolytic cells read out by the application of the pulses before switching to successive ones of the plurality of electrolytic cells.

5. The digital readout of claim 1, wherein the voltage across the electrolytic cell rises when substantially all of the active material has been deplated and wherein the second and third means provide for a temporary inhibiting of the application of pulses when the voltage across the electrolytic cell rises and then falls below a predetermined period of time and wherein the second and third means provide for a permanent inhibiting of the application of pulses when the voltage across the electrolytic cell rises and then remains above the predetermined level for a period of time greater than the predetermined period of time.

6. The digital readout for an electrolytic cell of claim 1 wherein the first means includes oscillator means for producing a signal of a fixed frequency and a pulse generator means responsive to the oscillating means for producing pulses at the fixed frequency.

7. The digital readout of claim 1 wherein the first means includes a multivibrator for producing a pulse signal of a fixed pulse width and a constant current generator controlled by the multivibrator to produce the constant amplitude fixed pulse width pulses for application to the electrolytic cell.

8. A variable rate digital readout for an electrolytic cell having information stored in the electrolytic cell in the form of active material plated on a first one of at least two electrodes, including
   first means for producing a pulse signal and with each pulse in the pulse signal having a constant amplitude and a fixed pulse width,
   second means coupled to the first means and to the electrolytic cell for applying the pulse signal to the electrolytic cell in a direction to deplate the active material plated on the first one of the electrodes,
   third means coupled to the electrolytic cell for detecting a rise in voltage across the electrolytic cell above a first predetermined value and for inhibiting the application of the pulse signal to the electrolytic cell in response to such detection, and
   fourth means coupled to the third means for providing a delay of a predetermined period of time and for permanently inhibiting the application of the pulse signal to the electrolytic cell when the voltage across the electrolytic cell remains above a second predetermined value for at least the predetermined period of time and for allowing the continued application of the pulse signal when the voltage across the electrolytic cell falls below the second predetermined value before the expiration of the predetermined period of time.

9. The digital readout of claim 8 additionally including a digital counter means for providing a digital output indication in accordance with the number of pulses applied to the electrolytic cell.

10. The digital readout of claim 8 additionally including fifth means for printing out a numerical indication of the number of pulses applied to the electrolytic cell.

11. The digital readout of claim 8 wherein a plurality of electrolytic cells may be read out in succession and additionally including selector means for successively switching to individual ones of the plurality of electrolytic cells and with each individual one of the plurality of electrolytic cells read out by the application of the pulses before switching to successive ones of the plurality of electrolytic cells.

12. The digital readout for an electrolytic cell of claim 8 wherein the first means includes oscillator means for producing a signal of a fixed frequency and a pulse generator means responsive to the oscillating means for producing pulses at the fixed frequency.

13. The digital readout of claim 8 wherein the first means includes a multivibrator for producing a pulse signal of a fixed pulse width and a constant current generator controlled by the multivibrator to produce the constant amplitude fixed pulse width pulses for application to the electrolytic cell.

14. The digital readout of claim 8 wherein the predetermined period of time is approximately 4 to 6 seconds and wherein the first predetermined value is approximately 0.5 volts and the second predetermined value is approximately 0.4 volts.

15. A digital readout system for a plurality of electrolytic cells wherein each electrolytic cell contains information stored in the form of active material plated on a first one of at least two electrodes, including
first means for producing a pulse signal including pulses of constant amplitude and fixed width,
second means coupled to the first means for selectively coupling the pulse signal to individual ones of the plurality of electrolytic cells for deplating the active material plated on the first one of the electrodes,
third means coupled to the individual ones of the electrolytic cells and to second means for detecting when substantially all of the active material has been deplated from the individual ones of the plurality of electrolytic cells and for controlling the second means to couple the pulse signal to different ones of the plurality of electrolytic cells until the information stored in all of the electrolytic cells has been read out, and
fourth means for providing an output indication of the information stored in the individual ones of the plurality of electrolytic cells in accordance with the number of pulses required to deplate substantially all of the active material in the individual ones of the plurality of electrolytic cells.

16. The digital readout of claim 15 wherein the fourth means includes a digital counter for providing a digital output indication in accordance with the number of pulses applied to each one of the plurality of the electrolytic cells.

17. The digital readout of claim 15 additionally including fifth means for printing out a numerical indication of the number of pulses applied to each of the plurality of the electrolytic cells.

18. The digital readout of claim 15 wherein the second means includes a selector switch for successively switching to individual ones of the plurality of electrolytic cells and with each individual one of the plurality of electrolytic cells read out by the application of the pulses before switching to successive ones of the plurality of electrolytic cells.

19. The digital readout of claim 15 wherein the voltage across each of the electrolytic cells rises when substantially all of the active material has been deplated and wherein the third means provide for a temporary inhibiting of the application of pulses when the voltage across each of the electrolytic cells rises and then falls below a predetermined level within a predetermined period of time and wherein the third means provide for a permanent inhibiting of the application of pulses when the voltage across each of the electrolytic cells rises and then remains above the predetermined level for a period of time greater than the predetermined period of time.

20. The digital readout for an electrolytic cell of claim 15 wherein the first means includes oscillator means for producing a signal of a fixed frequency and a pulse generator means responsive to the oscillator means for producing pulses at the fixed frequency.

21. The digital readout of claim 15 wherein the first means includes a multivibrator for producing a pulse signal of a fixed pulse width and a constant current generator controlled by the multivibrator to produce the constant amplitude fixed pulse width pulses for application to the electrolytic cell.

22. The digital readout of claim 15 additionally including a delay means responsive to the fourth means providing the output indication and with the output of the delay means controlling the second means to selectively couple the pulse signal to a successive one of the electrolytic cells.

23. An apparatus for detecting information contained in an electrolytic cell in the form of active material plated on a particular electrode of the cell, comprising:
first means for deplating the particular electrode of the electrolytic cell by passing a variable stream of electrical pulses through the cell whereby the voltage across the cell increases as the deplating proceeds;
second means connected between the cell and the first means for sensing the voltage across the electrolytic cell and reducing the rate of the pulse stream in accordance with the voltage sensed; and
third means connected to the first means for providing a dynamic indication of the information in accordance with the amount of active material deplated from the particular electrode of the cell.

24. The apparatus as defined in claim 23 wherein the second means comprises:
fourth means for sensing the voltage across the electrolytic cell;
fifth means for inhibiting the first means when a predetermined voltage has been detected by the fourth means whereby the voltage on a particular cell decays after the first means has been inhibited;
sixth means in contact with the first means and fourth means and responsive to the rate of voltage decay of the particular cell, the sixth means having characteristics for reactivating the first means if the rate of decay is less than a predetermined rate.

25. The apparatus as recited in claim 24 wherein the predetermined voltage is 0.5 volts and the predetermined of voltage decay is approximately 0.1 volts in 4 to 6 seconds.

26. The apparatus as recited in claim 5 wherein the third means comprises:
seventh means for dynamically counting the number of pulses which have been applied to the particular cell; and
eighth means for dynamically displaying the amount of information detected in the cell in accordance with the number of pulses applied to the cell.

* * * * *